(12) United States Patent
Patel et al.

(10) Patent No.: US 7,160,496 B2
(45) Date of Patent: Jan. 9, 2007

(54) THERMOPLASTIC COMPOSITIONS CONTAINING METAL MATERIAL

(75) Inventors: Sandip R. Patel, Miamisburg, OH (US); Kenneth Alan Gassman, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 293 days.

(21) Appl. No.: 10/286,021

(22) Filed: Nov. 1, 2002

(65) Prior Publication Data

US 2004/0087699 A1    May 6, 2004

(51) Int. Cl.
*B28B 1/02*    (2006.01)
*B29B 9/00*    (2006.01)
*B29C 41/18*   (2006.01)
*B29D 11/00*   (2006.01)
*G01V 9/00*    (2006.01)

(52) U.S. Cl. ............... 264/302; 264/2.1; 264/6; 264/428; 264/429; 264/486; 264/487; 264/114; 264/310; 264/311; 264/319; 264/331.11; 524/439

(58) Field of Classification Search ............... 264/302, 264/2.1, 6, 428, 429, 486, 487, 114, 310, 264/311, 319, 331.11; 524/439
See application file for complete search history.

(56) References Cited

U.S. PATENT DOCUMENTS

| | | | |
|---|---|---|---|
| 4,680,140 A | 7/1987 | Kageyama | |
| 4,774,269 A | 9/1988 | Thum | |
| 4,891,399 A | 1/1990 | Ohkawa et al. | |
| 5,094,607 A * | 3/1992 | Masters ...................... | 425/429 |
| 5,344,635 A | 9/1994 | Bujard et al. | |
| 6,040,362 A | 3/2000 | Mine et al. | |
| 6,153,680 A | 11/2000 | Shah et al. | |
| 6,191,204 B1 | 2/2001 | Johnson | |
| 6,265,471 B1 | 7/2001 | Dietz | |
| 6,593,002 B1 | 7/2003 | Shah et al. | |

FOREIGN PATENT DOCUMENTS

WO    01/35068    5/2001

* cited by examiner

*Primary Examiner*—Patrick Niland
(74) *Attorney, Agent, or Firm*—Jimmy L. Funke

(57) ABSTRACT

Thermoplastic compositions containing metal materials and a method for preparing the same. The compositions are formed into particles having diameters suitable for a rotational thermoforming processing. The compositions are particularly applicable for use in slush molding processes where efficient heat transfer to the material is desired to form improved surface quality thermoplastic skin. A preferred method for preparing thermoplastic compositions containing metal material into a slush moldable powder comprises melt compounding the composition to form pellets, and further processing the pellets by cryogenic pulverization. A preferred method for forming micropellets uses an extruder having a gear pump to increase the melt pressure.

14 Claims, 6 Drawing Sheets

THERMOPLASTIC COMPOSITIONS CONTAINING METAL MATERIAL

TECHNICAL FIELD

The present invention relates to thermoplastic compositions and more specifically to thermoplastic compositions containing metal material for improved skin characteristics.

BACKGROUND OF THE INVENTION

Thermoplastic compositions are actively pursued for use in rotational molding processes, such as slush molding, as an alternative to typical thermoforming processes to fabricate articles of manufacture. In the automotive field, thermoplastic compositions have been used for the fabrication of articles such as interior sheathing, used for instrument panel skins, door panels, air bag covers, roof liners and seat covers.

Many of the articles have surface appearances and designs having complex surface characteristics, such as contours and geometric technical grains, and may be produced in a slush molding process. However, other material properties such as strength and low shear viscosity desired for slush molding processing are difficult to achieve with current thermoplastic compositions. Current thermoplastic compositions, such as thermoplastic polyolefin and thermoplastic polyurethane, are often processed for prolonged time periods at high temperatures to form fused skins in a slush molding process. The compositions of such thermoplastic materials may degrade during processing, however, which in turn may alter the material properties, such as the strength of the material and the uniform fusion of the composition. As a result, articles produced using thermoplastic compositions may have unacceptable surface appearance and mechanical properties.

Thus, there is a need in the art for a thermoplastic composition with low near zero shear viscosity at molding temperatures for use in slush molding to achieve acceptable surface appearance while maintaining other material properties such as tensile strength. In addition, there is a need in the art for a method for preparing a thermoplastic composition with improved properties such as uniform melt fusion and heat conductivity for use in the fabrication of articles with improved surface skin characteristics. There is a still further need to convert the composition into a suitable powder (avg. particle size in the range of about 75 μm to about 400 μm) and/or micropellet form (avg. particle size in the range of about 300 μm to about 900 μm), with good mechanical flow during the slush molding process. There is a further need in the art for a process for preparing such a composition for use in manufacturing automotive and non-automotive articles of manufacture.

SUMMARY OF THE INVENTION

Described herein are polymer compositions containing metal material, processes for preparing the compositions, and articles of manufacture prepared from the compositions. In one embodiment, a composition is disclosed comprising a blend of about 80.0 weight percent (hereinafter "wt. %") to about 99.9 wt. % thermoplastic polymer matrix and about 0.1 wt. % to about 20.0 wt. % metal material, the metal materials being particles of a magnetic and/or non-magnetic metal material such as tin, iron, nickel, stainless steel and mixtures thereof. By including a metal material in the composition, the composition can achieve low near zero shear viscosity in a shortened cycle time and at a reduced processing medium (such as hot air and hot oil) temperature because of improved heat transfer. In additional embodiments of the invention, the thermoplastic polymer matrix can be, for example, a polyvinyl chloride (PVC) composition, a thermoplastic polyolefin (TPO) composition, a thermoplastic urethane (TPU) composition or a thermoplastic elastomer (TPE) composition.

A preferred process for the preparation of polymer compositions containing metal material comprises mixing about 80.0 to about 99.9 wt. % thermoplastic polymer matrix and about 0.1 to about 20.0 wt. % metal material in a manner to achieve the benefits described above.

In additional embodiments, methods of preparing slush moldable powder and slush moldable micropellets are provided, as well as articles of manufacture prepared with the compositions.

In another embodiment, a method of rotational molding such as slush molding the composition into articles of manufacture is provided.

These and other features and advantages of the present invention will be apparent from the following brief description of the drawings, detailed description, and appended claims and drawings.

BRIEF DESCRIPTION OF THE DRAWINGS

Referring now to the drawings which are meant to be exemplary and not limiting.

DESCRIPTION OF THE PREFERRED EMBODIMENT(S)

Figure 1:
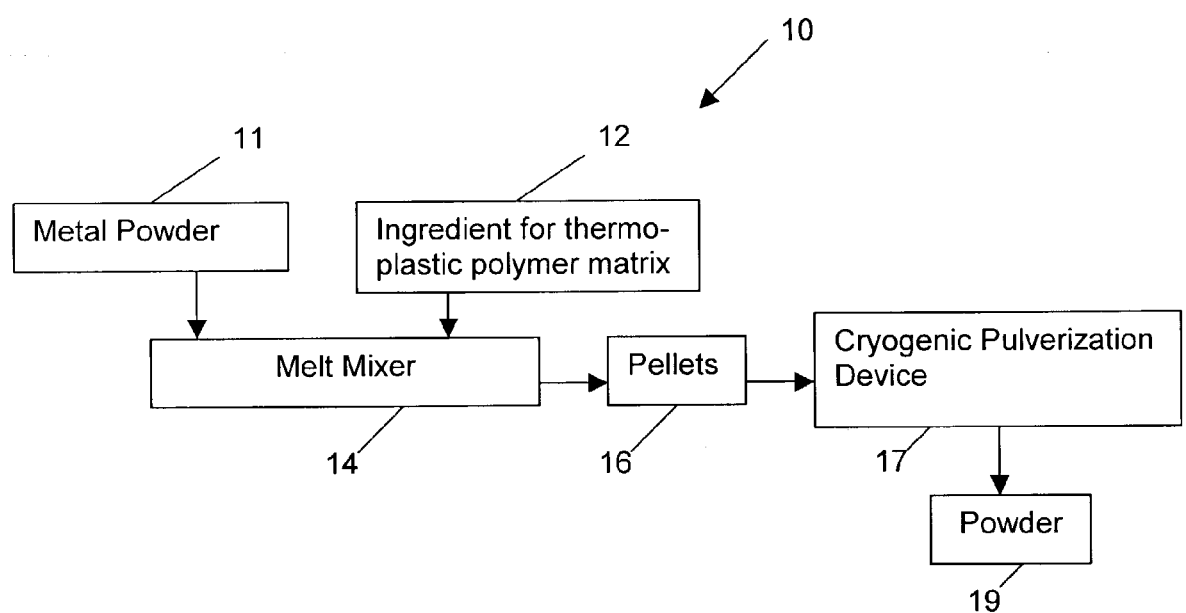
FIG. 1 is a schematic illustration of a method of preparing a slush moldable thermoplastic polymer powder in accordance with the present invention.

Described herein are thermoplastic compositions and articles of manufacture containing certain proportions of metal materials, as well as processes for preparing the compositions and articles of manufacture. In one embodiment, a slush moldable thermoplastic composition containing a metal material comprises a mixture of about 80.0 wt. % to about 99.9 wt. % thermoplastic polymer matrix and about 0.1 wt. % to about 20.0 wt. % metal material. A suitable particle size of the metal material ranges from about 4 to about 100 μm in diameter. The melt viscosity of the thermoplastic compositions for use in slush molding can be, but is not limited to, in the range of about 50 Pa.s to about 250 Pa.s over the processing temperature range of 180° C. to 260° C. as measured at low shear rate such as that applied by a parallel plate rheometer. High Melt Flow Index materials (as measured according to ASTM D1238) with a Melt Flow Index (MFI) greater than about 20.0 grams/10 minutes (g/10 min) measured at 230° C. employing a 2.16 kilogram (kg) weight (>20 g/10 min) are selected to obtain low melt viscosity of the composition. Also, polymers are selected for blend compatibility and/or miscibility (mutual solubility) to provide compositions with the desired low melt viscosity and improved flow properties. Since polymers and thermoplastic compositions are generally poor conductors of heat, high processing temperatures and longer processing time cycles which are often required, may cause polymer material degradation.

The thermoplastic compositions of the present invention comprise about 0.1 to about 20.0 wt. %, are preferably about 3.0 to about 10.0 wt. %, metal material. Suitable metal materials include magnetic and non-magnetic metal material particles, such as copper, tin, nickel, iron, and/or stainless steel and mixtures thereof. The metal material of the present invention preferably comprises metal particles, such as metal powder. A suitable particle size of the powder metal material ranges from about 4 to about 100 µm. The precise size and selection of metal material particles is determined by the desired application and will be known to persons skilled in the art.

The addition of metal material to the thermoplastic polymer matrix improves the heat conductivity and melt flow of the composition during the processing and thereby lowers the molding and processing temperature and reduces the cycle time in a slush molding process. The resultant compositions may attain a desired low near zero shear viscosity while maintaining desired material properties, such as uniform melt fusion and tensile strength, at molding temperatures. The addition of metal material into the thermoplastic polymer matrix also provides a composition that may be heated by induction heating.

In additional embodiments of the invention, the thermoplastic polymer matrix can be a polyvinyl chloride (PVC) composition, a thermoplastic polyolefin (TPO) composition, a thermoplastic polyurethane (TPU) composition and/or a thermoplastic elastomer (TPE) composition.

A typical polyvinyl chloride (PVC) composition can be slush moldable in a powder form. The particles of slush moldable PVC preferably can have an average diameter of about 150 µm. The PVC powder can be produced during a typical polymerization process or the like. The composition and process of preparing the PVC powder will be known to persons skilled in the art and determined by the desired application of the PVC powder. The desired ingredients can be added to particles of PVC powder, discussed in detail herein. The thermoplastic ingredients and PVC powder can be dry blended together, producing a PVC composition having a typical finished particle size of about 175 µm. A metal material such as metal powder is added during a dry blending step of preparing the PVC or another separate mixing step, as determined by the desired application.

A typical thermoplastic polyolefin composition can comprise a variety of polymer ingredients, including polypropylene. Suitable polypropylene can include for example, but is not limited to, crystalline polypropylene and is intended to include in addition to the homopolymer those polymers that also contain minor amounts, usually not greater than about 15.0 wt. % based on the total weight of the polypropylene, of other olefin monomers, for example ethylene, butene, octene and the like. Suitable polypropylene polymers have melt flow indices in the range of about 1 to about 400 grams/10 minutes (g/10 min.) measured at 230° C. employing a 2.16 kilogram (kg) weight.

Another suitable ingredient in a typical thermoplastic polyolefin composition comprises ethylene copolymer elastomer, such as ethylene-based rubber. Suitable ethylene copolymer elastomers include, but are not limited to, ethylene-propylene, ethylene-butene, ethylene-octene, ethylene-pentene, ethylene-hexene copolymers and the like, as well as combinations comprising at least one of the forgoing ethylene copolymer elastomers, having glass transition temperatures of about down to −70° C. or less. Other suitable ethylene copolymer elastomers include ethylene-propylene non-conjugated diene copolymer (EPDM). The non-conjugated dienes contain about 6 to about 22 carbon atoms and have at least one readily polymerized double bond. The ethylene-propylene copolymer elastomer contains about 60.0 wt. % to about 80.0 wt. %, usually about 65.0 wt. % to about 75.0 wt. % ethylene, based on the total weight of the EPDM. The amount of non-conjugated diene is generally about 0.1 wt. % to about 7.0 wt. %, usually about 2.0 wt. % to about 5.0 wt. %, based on the total copolymer. Suitable EPDM copolymers include, but are not limited to, ethylene-propylene-1,4 hexadiene, ethylene-propylene dicyclopentadiene, ethylene-propylene norbornene, ethylene-propylene-methylene-2-norbornene, and ethylene-propylene-1,4-hexadiene/norbornadiene copolymer.

Thermoplastic polyolefin compositions can further comprise styrenic elastomer, often in the form of random or block copolymer with a molecular styrene content below 50.0 wt. % based upon the total weight of the styrenic elastomer and the remainder being made up of saturated aliphatic hydrocarbon polymer or copolymer.

In addition, a suitable thermoplastic polyolefin composition, as well as a thermoplastic polymer matrix such as PVC, TPU, TPE can comprise at least one of the group comprised of polymer additive, particulate filler, stabilizer and color pigment, and mixtures thereof.

Suitable polymer additives include those chosen to improve scratch resistance, such as fatty acid amides like oleamide and erucamide, and siloxane. Suitable particulate filler includes hydrated silicate such as talc and montmorillonite clay. The particle size range of the silicate should be in the range of about 1 to about 40 µm and preferably in the range of about 1 to about 20 µm. A suitable particulate filler may further enhance the mechanical flow of a thermoplastic polymer matrix.

A thermoplastic polyolefin composition can optionally comprise a stabilizer, such as heat stabilizer, light stabilizer and the like, as well as combinations comprising at least one of the foregoing stabilizers. Heat stabilizers include phenolics, hydroxyl amines, phosphates, ands the like, as well as combinations comprising at least one of the foregoing heat stabilizers. Light stabilizers include low molecular weight (having number-average molecular weights less than about 1,000 AMU) hindered amines, high molecular weight (having number-average molecular weights greater than about 1,000 AMU) hindered amines, and the like, as well as combinations comprising at least one of the foregoing light stabilizers. Optionally, various additives known in the art may be used as needed to impart various properties to the composition, such as heat stability, stability upon exposure to ultraviolet wavelength radiation, long-term durability, and processability. The exact amount of stabilizer is readily empirically determined.

A suitable thermoplastic polyolefin composition may further optionally comprise a color pigment or a combination of color pigments. Suitable color pigments are known to those skilled in the art and the exact amount of color pigment is readily empirically determined based on the desired color characteristic of the formulation and the finished product.

Table 1 provides a list of components suitable for use in the thermoplastic polyolefin compositions and examples discussed herein. It will be understood that the components listed in Table 1 are given only for the purpose of illustration and are not intended to limit the invention.

TABLE 1

| Component | Source | Trade Name |
|---|---|---|
| Polypropylene | Basell, Equistar, Exxon, Huntsman | Profax ®, Valtec ®, Petrothene ®, Escorene ® |

TABLE 1-continued

| Component | Source | Trade Name |
|---|---|---|
| Ethylene Copolymer Rubber | DSM, DuPont Dow, Exxon | Keltan ®, Engage ®, Exact ® |
| Styrenic Copolymer Elastomer | JSR, Kraton, Kuraray | Dynaron ®, Kraton ®, Septon ® |
| Stabilizers | Ciba, Cytex, Great Lakes Chemicals | Irganox ®, Tinuvin ®, Cyanox ®, Cyasorb ® |
| Particulate filler | Southern Clay Products, Nanocor | Cloisite ®, Nanomer ® |
| Polymer additive | Ciba, Croda, Dow Corning | Atmer ®, Crodamide ®, UHMW Siloxane ® |

Also, the ingredients and nature of the thermoplastic polyolefin composition are known to one skilled in the art and are not limited by the discussion herein. The thermoplastic composition selected as the thermoplastic polyolefin composition of the present invention will be determined by the desired application.

Slush molding of current thermoplastic compositions often involves processing the thermoplastic compositions at high temperatures to achieve the desired viscosity. The present composition of a thermoplastic polymer matrix with a metal material can increase the heat conductivity and mechanical flow of the thermoplastic composition and provide an improved slush moldable thermoplastic composition. In a slush molding process using the composition of the present invention, the composition may be heated by induction heating, either by itself or in conjunction with other heating methods such as hot air.

The slush moldable thermoplastic compositions are prepared, for example, by melt blending the ingredients under high shear conditions using an internal mixer, such as Banbury type mixer, or by using a twin-screw extruder with screw elements selected to provide high shear for good distributive mixing of components. The resulting compositions can be processed further into smaller particles, such as pellets, micropellets, or powder, or any other suitable form. The smaller particles of the compositions are particularly useful for slush molding to achieve uniform skin formation. A suitable powder (avg. particle size in the range of about 75 µm to about 400 µm) and/or micropellet form (avg. particle size in the range of about 300 µm to about 900 µm) will provide a slush moldable thermoplastic composition with good mechanical flow during the slush molding process.

In one embodiment, as shown in FIG. 1, a method depicted generally by the reference numeral 10, comprises preparing introducing a metal material 11 and the ingredients of a thermoplastic polymer 12 into a mixing device, such as a melt mixer 14 to form pellets 16. Melt mixing may be accomplished by using an extruder, such as a twin screw extruder or an internal mixer, such as a Banbury type mixer. The pellets 16 then undergo cryogenic pulverization (pulverized at cryogenic temperature) in a cryogenic pulverization device 17, with an average particle size of about 75 to about 500 µm. Cryogenic pulverization is a shearing/impact process which makes non-uniform particles.

Figure 2:
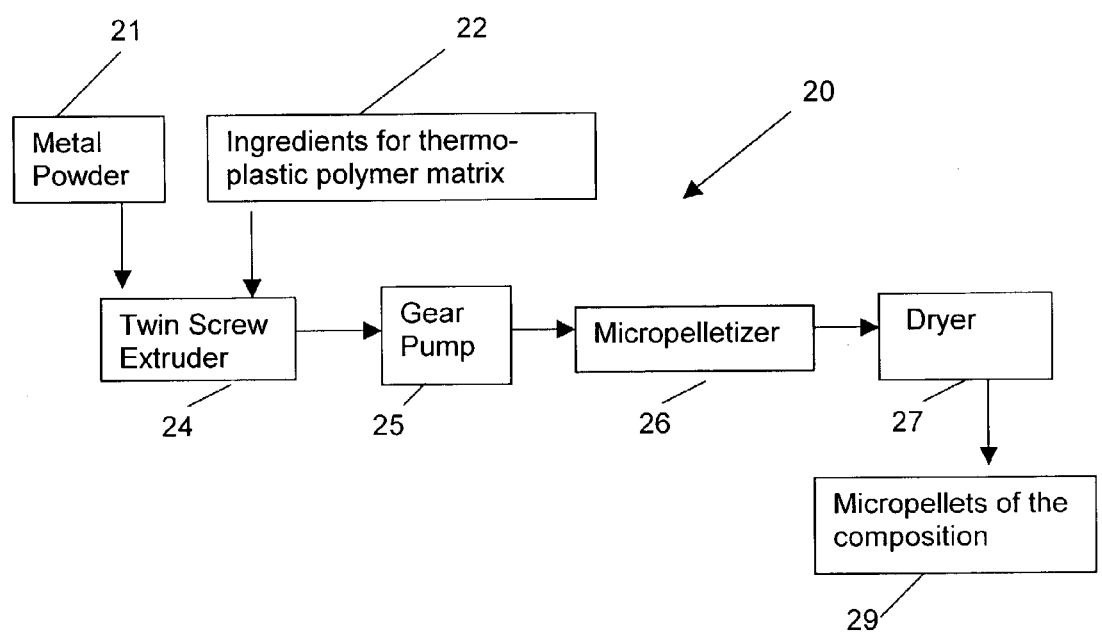
FIG. 2 is a schematic illustration of a method of preparing slush moldable thermoplastic polymer micropellets in accordance with the present invention.

In another embodiment, as shown in FIG. 2, the method depicted generally by the reference numeral 20, comprises forming micropellets 29 of the composition using a gear pump 25 as a means to achieve high backpressure from the twin-extruder 24 to a minibead die plate (not shown) which would eliminate a separate processing step. In process 20, the polymer ingredients 22 and metal material 21 are melt compounded by in-line extrusion, using an extruder, such as a twin screw extruder 24 with a gear pump 25 to increase the melt pressure. The resulting composition is then formed into micropellets of the composition in a micropellitizer 26. The micropellets of the composition are processed in a dryer 27, such as a centrifugal dryer.

Figure 3:
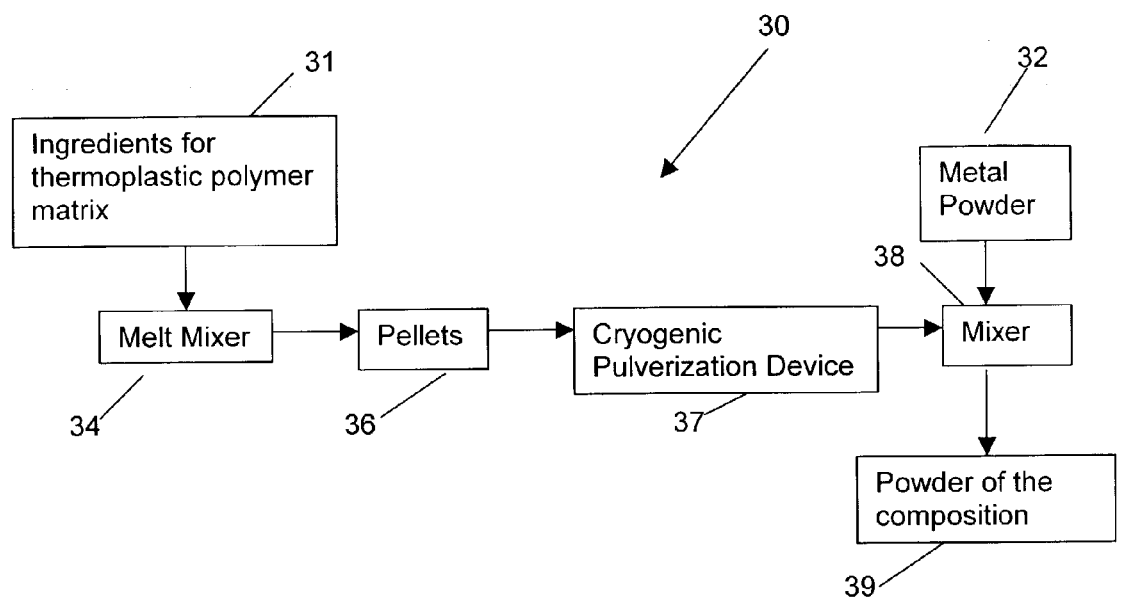
FIG. 3 is a schematic illustration of an additional method of preparing a slush moldable thermoplastic polymer powder in accordance with the present invention.

In an additional embodiment shown in FIG. 3, the method is depicted generally by reference numeral 30. The method of the invention 30 comprises preparing a powder of the composition 39. In this embodiment the ingredients for a thermoplastic polymer 31 are introduced into a mixing device, such as a melt mixer 34 to form pellets 36. As discussed herein, suitable melt mixing devices include extruders, such as a twin screw extruder or an internal mixer, such as a Banbury type mixer. The pellets 36 then undergo cryogenic pulverization (pulverized at cryogenic temperature) in a cryogenic pulverizing device 37. The pulverized composition together with a metal powder material 32 are then introduced into a mixer 38 to form a powder 39 of the present composition.

Figure 4:
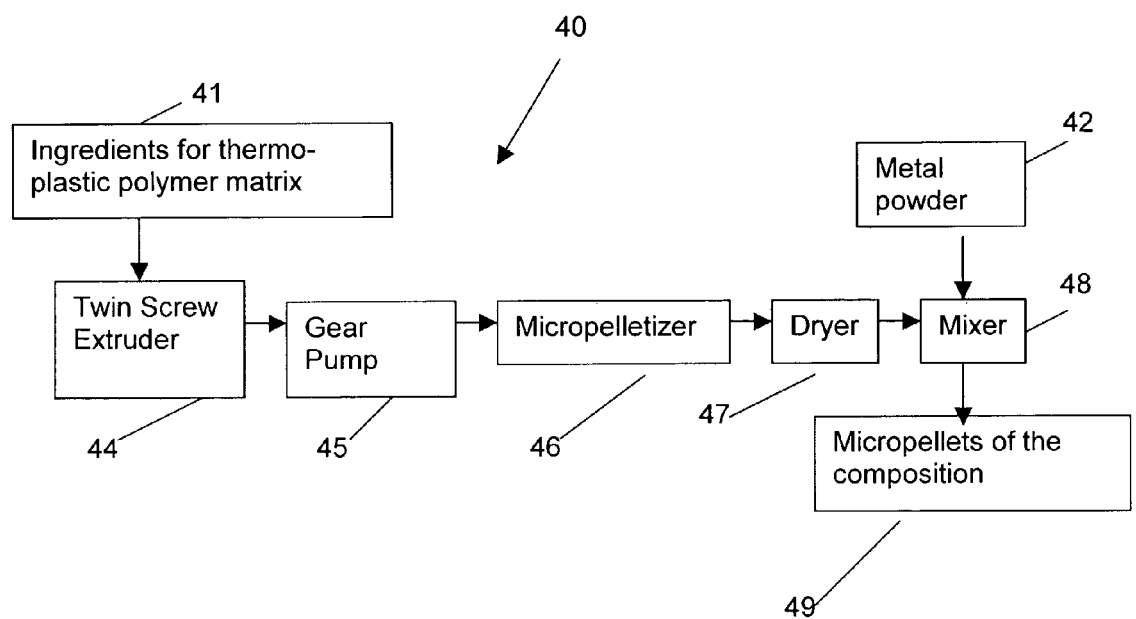
FIG. 4 is a schematic illustration of an additional method of preparing slush moldable thermoplastic polymer micropellets in accordance with the present invention.

Still another embodiment of the present invention is shown in FIG. 4, and depicted generally by the reference numeral 40. This method comprises preparing micropellets of the composition 49. In this embodiment, ingredients for thermoplastic polymer 41 are introduced to a mixing device, such as a twin screw extruder 44. In this embodiment the twin screw extruder 44 uses a gear pump 45 as a means to achieve high backpressure from the twin-extruder 44 to a minibead die plate (not shown). As described herein, the use of a gear pump 45 eliminates a separate processing step. The resulting composition is then formed into micropellets in a micropellitizer 46. The micropellets are processed in a dryer 47, such as a centrifugal dryer. The dried micropellets of thermoplastic polymer are then mixed with a metal powder material 42 in a mixer 48 to produce micropellets of the composition 49.

The micropellets of the present invention 29, 49 as formed by certain embodiments of the present invention are typically spherical and are larger particles than the cryoground powder 19, 39 particles. The micropellets are typically in the range of about 300 to about 900 µm. Slush molding can be achieved using either the cryoground powder 19, 39, the micropellets of the composition 29, 39 or combinations of the two for forming articles of manufacture therefrom.

The metal material may be added during the melt compounding as shown in FIG. 1 and FIG. 2, or as a secondary process such as mechanical mixing of the metal material with the powder and/or micropellets of the thermoplastic polymer matrix, as shown in FIG. 3 and FIG. 4. The exact composition and method of preparation will be determined by the desired application.

For successful slush molding, the powder and/or micropellets should possess good mechanical flow within the forming tool, such as a mold, during the rotation cycle. This property of mechanical flow can be quantified by measuring the time to empty a cup with an orifice at the bottom and with specific volume as shown in the following examples.

EXAMPLES

The following examples are given for the purpose of illustration and do not limit the invention. In the examples, all parts and percentages are by weight based on the total weight of the composition, unless otherwise specified.

Example 1

Composition A was prepared by melt mixing a thermoplastic polyolefin (TPO) composition into micropellet form. The composition A, in weight percent of total composition, comprised about 100% TPO composition.

Composition A had a measured powder flow of TPO in micropellet form of 4.7 seconds in a "Cup No. 5". The oven set temperature was 600° F. with a fuse time of about 3.5 minutes. The slush molded skin had inferior surface quality characterized by incomplete surface grain pattern, unacceptable pinholes and incompletely fused rough back surface.

Example 2

Composition B was prepared by melt mixing using a twin screw extruder and converting the composition into micropellets using the method set forth in FIG. 4. The composition, in total weight percent of the composition, comprised about 95.0 wt. % TPO and about 5.0 wt. % copper powder.

Composition B had a measured powder flow of 4.50 seconds in a "Cup No. 5." The oven set temperature was about 550° F. with a fuse time of about 2.5 minutes. The slush molded skin using composition B had better surface qualities characterized by a more complete surface grain pattern, minimal pinholes and fused rough back surface, than the TPO in micropellet form produced by the method set forth in Example 1.

In the Examples 1 and 2, discussed above, the set up utilized was a hot air slush molding process to heat the slush mold. The mold was preheated for about 30 minutes. The mold was then removed from the oven and rotated with a powder pan filled with micropellets of a thermoplastic composition and a thermoplastic composition containing metal material powder, respectively. Upon completing rotation, the slush mold was placed into the oven for material fusion at the oven set temperature. The mold was cooled prior to demolding.

As shown by Example 2, a thermoplastic composition containing a metal material reduces the processing time cycle, such as fuse time, in a rotational molding process such as slush molding. The oven temperature can also be lower than the temperature used in a slush molding process with a typical thermoplastic composition.

The composition of the present invention may be applied to a variety of rotational molding and heating systems. As illustrated in Examples 1 and 2, the present composition may be applicable in rotational molding such as slush molding using convection heating, such as a hot air oven. The present composition is also applicable for use in slush molding using conduction heating such as hot oil. In addition, the present composition may be used in slush molding using induction heating. The present composition comprised of a magnetic metal powder, such as magnetized stainless steel, may be more efficient in a slush molding using induction heating rather than a non-magnetic metal powder. Also, localized induction heating of composition is possible in areas difficult to slush mold in order to achieve a more uniform surface appearance and thickness. As an alternative, localized induction heating is also possible. The term "localized induction heating" as used herein refers to locally heating one or more portions of the composition within the mold using induction heating. Both induction heating and localized induction heating of the composition may be used in conjunction with other heating methods.

Figure 5:
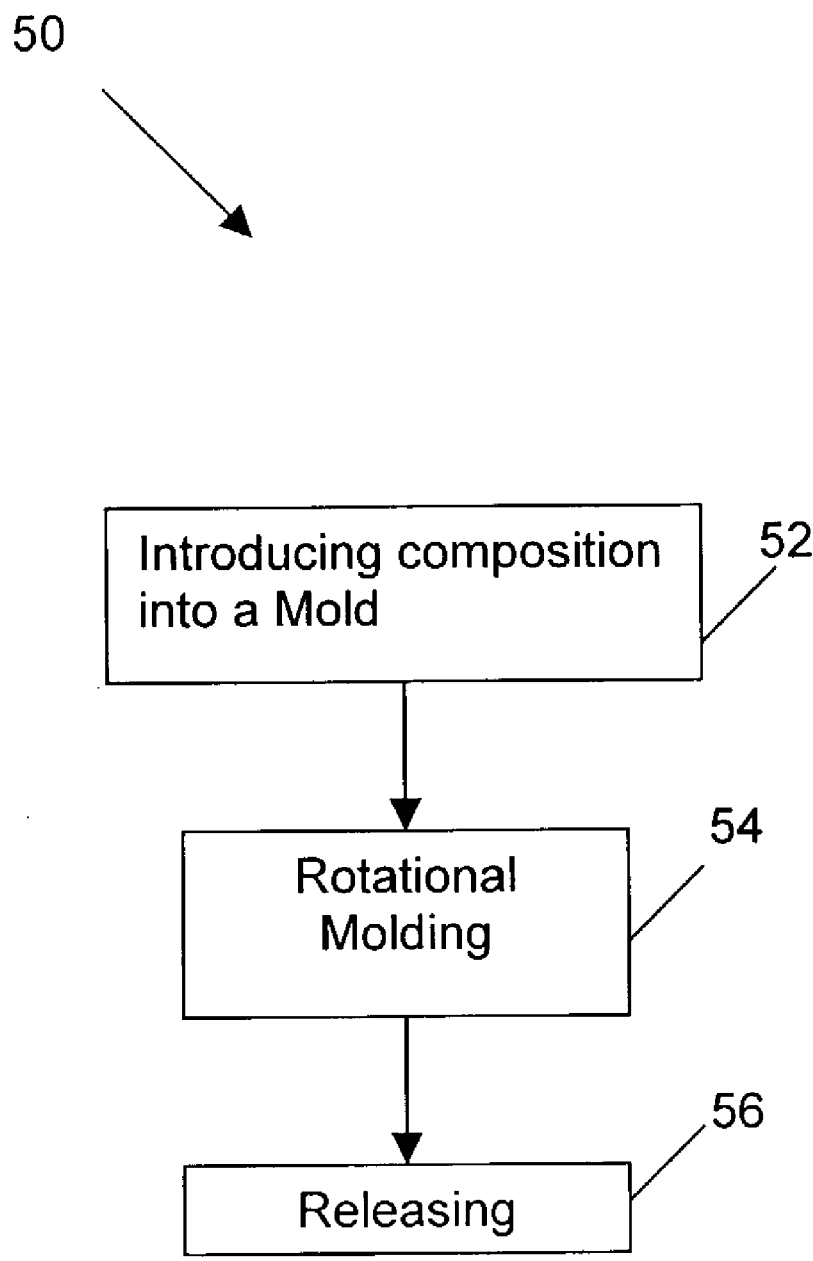
FIG. 5 is a schematic illustration of a method of rotationally molding the present composition in accordance with the present invention.

A schematic illustration of a method of rotationally molding the present composition 50 is shown in FIG. 5. In this embodiment, the method comprises the step of introducing a composition into a mold 52. The composition comprises a mixture of about 80.0 wt. % to about 99.9 wt. % thermoplastic polymer matrix and about 0.1 wt. % to about 20.0 wt. % metal material, based on the total weight of the composition. The mold may or may not be pre-heated. The method further comprises rotationally molding the composition 54. The step of rotationally molding 54 comprises rotating and heating the composition to achieve the desired properties. The composition may be heated by induction heating and/or localized induction heating, and may be in conjunction with other methods of heating. The composition is cooled within the mold forming an article of manufacture. The method further comprises releasing 56 the article prepared from the composition of the present invention.

Figure 6:
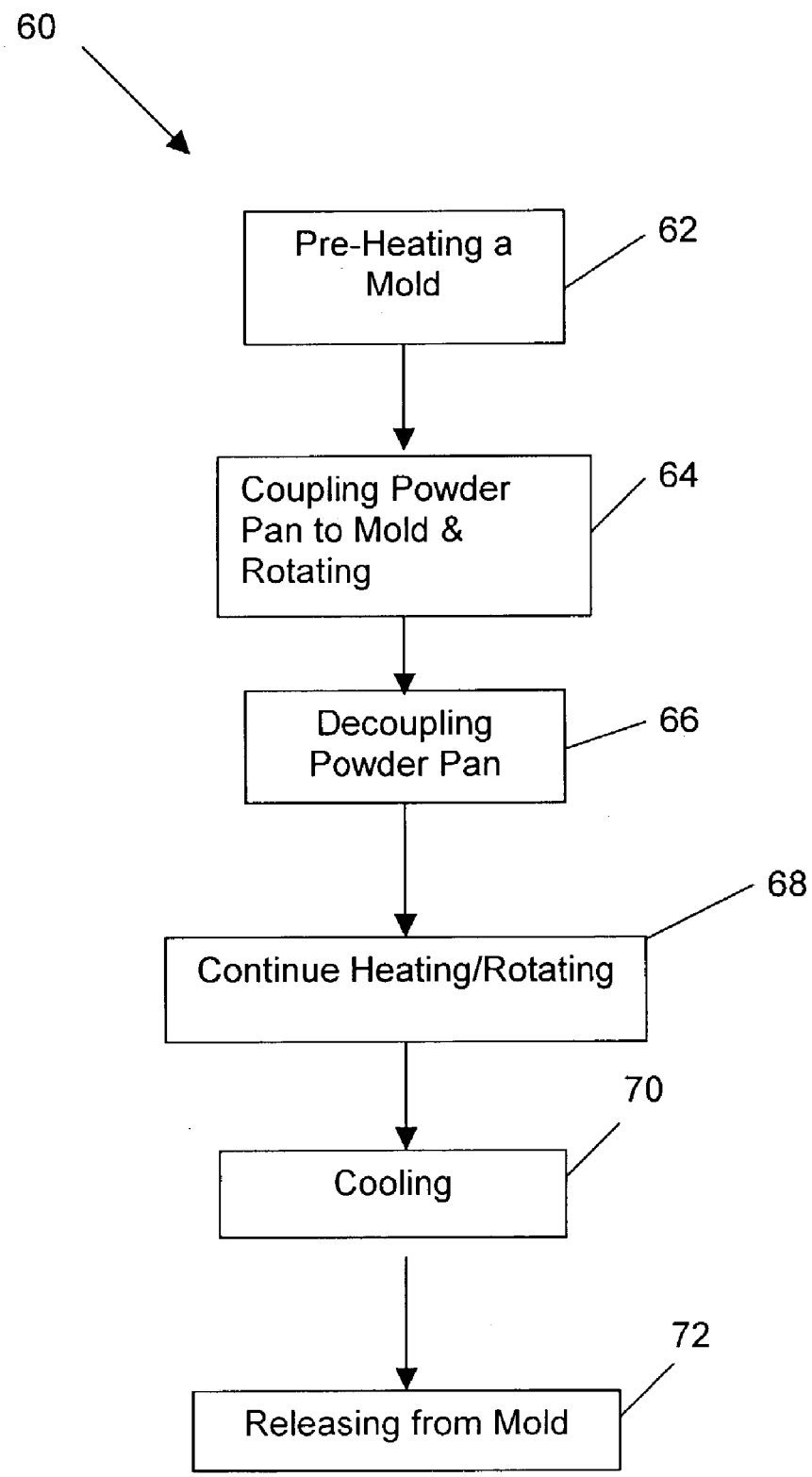
FIG. 6 is a schematic illustration of a method of slush molding the present composition in accordance with the present invention.

An additional embodiment is shown in FIG. 6, a schematic illustration of a method for slush molding the present composition 60. In this embodiment, the method 60 comprises pre-heating 62 a mold to a temperature suitable for a slush molding process. The method 60 further comprises coupling a powder pan containing the present composition to the mold and rotating 64 the mold and powder pan so that the composition enters into the mold. The composition may be heated using induction heating. The composition comprises a mixture of about 80.0 wt. % to about 99.9 wt. % thermoplastic polymer matrix and about 0.1 wt. % to about 20.0 wt. % metal material, based on the total weight of the composition. When the desired amount of composition has entered into the mold, the method comprises decoupling the powder pan 66 from the mold. The excess composition remains within the powder pan and is removed from the process in this manner.

The mold continues rotating and heating 68 the composition to achieve the desired properties. While rotating, the composition may be heated by induction heating in conjunction with or without hot air and/or other suitable methods of heating the composition within the mold. Localized induction heating may be appropriate in some applications. The composition continues rotating at a determined temperature profile to achieve a good surface quality and uniform fusion. The method further comprises cooling 70 the composition within the mold. When the composition has attained the appropriate properties and shape, the process 60 comprises releasing 72 the article from the mold.

It is to be understood that the embodiments of the present compositions, methods and articles made therefrom, although primarily described in relation to vehicle application such as interior sheathing, including instrument panel skins, door panels, air bag covers, roof liners and seat covers, can be utilized in numerous automotive and non-automotive applications.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

It will be understood that a person skilled in the art may make modifications to the particular embodiments described herein within the scope and intent of the claims. While the present invention has been described as carried out in specific embodiments thereof, it is not intended to be limited thereby, but is intended to cover the invention broadly within the scope and spirit of the claims.

What is claimed is:

1. A method of making an article of manufacture comprising:
introducing particles into a mold, said particles providing a composition comprising about 80.0 wt. % to about 99.9 wt. % thermoplastic polymer and about 0.1 wt. % to about 20.0 wt. % metal material, based on the total weight of the composition; and
slush molding the composition by rotating the mold while induction heating at a temperature and for a time sufficient to fuse said particles to form a slush molded article comprising metal material within a thermoplastic polymer matrix;
wherein the particles comprise powder formed by:
introducing said thermoplastic polymer into a melt mixer;
melt mixing said thermoplastic polymer to form a melted thermoplastic polymer;
processing said melted thermoplastic polymer to form pellets; and
cryogenically pulverizing said pellets to form said powder.

2. A method of making an article of manufacture comprising:
introducing particles into a mold, said particles providing a composition comprising about 80.0 wt. % to about 99.9 wt. % thermoplastic polymer and about 0.1 wt. % to about 20.0 wt. % metal material, based on the total weight of the composition; and
slush molding the composition by rotating the mold while induction heating at a temperature and for a time sufficient to fuse said particles to form a slush molded article comprising metal material within a thermoplastic polymer matrix;
wherein the particles comprise micropellets formed by:
introducing said thermoplastic polymer into an extruder having a gear pump;
extruding said thermoplastic polymer composition to form a blend;
processing said blend to form the micropellets; and
drying said micropellets.

3. A method of making an article of manufacture comprising:
introducing particles into a mold, said particles providing a composition comprising about 80.0 wt. % to about 99.9 wt. % thermoplastic polymer and about 0.1 wt. % to about 20.0 wt. % metal material, based on the total weight of the composition; and
slush molding the composition by rotating the mold while induction heating at a temperature and for a time sufficient to fuse said particles to form a slush molded article comprising metal material within a thermoplastic polymer matrix;
wherein the particles comprise powder formed by:
melt compounding the thermoplastic polymer and the metal material to form a blend;
processing said blend to form pellets; and
cryogenically pulverizing said pellets to form a powder.

4. A method of making an article of manufacture comprising:
introducing particles into a mold, said particles providing a composition comprising about 80.0 wt. % to about 99.9 wt. % thermoplastic polymer and about 0.1 wt. % to about 20.0 wt. % metal material, based on the total weight of the composition; and
slush molding the composition by rotating the mold while induction heating at a temperature and for a time sufficient to fuse said particles to form a slush molded article comprising metal material within a thermoplastic polymer matrix;
wherein the particles comprise micropellets formed by:
extruding a mixture of said thermoplastic polymer and said metal material to form a blend; and
processing said blend to form micropellets.

5. A method of making an article of manufacture comprising:
introducing a composition into a mold, said composition comprising about 80.0 wt. % to about 99.9 wt. % thermoplastic polymer and about 0.1 wt. % to about 20.0 wt. % metal material, based on the total weight of the composition; and
slush molding the composition by rotating the mold while induction heating at a temperature and for a time sufficient to fuse the composition to form a slush molded article comprising metal material within a thermoplastic polymer matrix;
wherein introducing the composition into the mold comprises introducing a combination of a powder and micropellets of the composition.

6. The method of claim 5, wherein introducing the composition into the mold comprises introducing particles having average diameters in the range of about 75 μm to about 400 μm.

7. The method of claim 5, wherein introducing the composition into the mold comprises introducing particles having average diameters in the range of about 300 μm to about 900 μm.

8. The method of claim 1, wherein said induction heating is carried out in conjunction with other means of heating the composition within said mold.

9. The method of claim 8, wherein induction heating comprises localized induction heating.

10. The method of claim 1, wherein the composition comprises a thermoplastic polyolefin composition.

11. The method of claim 1, wherein the metal material comprises about 3.0 wt. % to about 10.0 wt. % based on the total weight of the composition.

12. The method of claim 1, wherein the metal material is chosen from the group consisting of tin, copper, iron, nickel, stainless steel and mixtures thereof.

13. The method of claim 1, wherein the metal material comprises a magnetic metal material.

14. The method of claim 1, wherein the metal material comprises metal material particles having average diameters of about 4 to about 100 μm.

* * * * *